United States Patent Office 2,797,145
Patented June 25, 1957

2,797,145

PRODUCTION OF ANHYDROUS HYDROCHLORIC ACID GAS FROM AQUEOUS HYDROCHLORIC ACID SOLUTION

Everett E. Gilbert, Flushing, and Benjamin Veldhuis, Albertson, N. Y., assignors to Allied Chemical & Dye Corporation, New York, N. Y., a corporation of New York No Drawing. Application August 12, 1953,
Serial No. 373,908

3 Claims. (Cl. 23—154)

This invention relates to methods for dehydrating aqueous hydrochloric acid and to manufacture of substantially anhydrous hydrochloric acid.

Many users of highly dehydrated or substantially anhydrous hydrochloric acid have available, either as a by-product of their own operations or from economic purchase sources, substantial quantities of weak hydrochloric acid ranging in strength from say 10% up to a principal commercial strength grade of about 35% HCl. Previously, several methods have been employed for dehydrating aqueous hydrochloric acid to form substantially anhydrous hydrogen chloride in gas or liquid form. Some prior processes for making anhydrous hydrochloric acid are characterized in general by treating aqueous hydrochloric acid with concentrated sulfuric acid, and by utilization of calcium chloride and similar dehydrating agents. Such methods possess two outstanding operating disadvantages, namely, necessity of relatively cumbersomely constructed and operated towers, and production of large quantities of dilute or spent dehydrating agents which require reconcentration, fortification or reactivation to avoid prohibitive economic loss. Probably the bulk of anhydrous hydrochloric acid presently produced from aqueous hydrochloric acid is made by stripping out the $H_2O$ content thereof by means of tower or tower-like operations in which sulfuric acid initially of say 93–98% $H_2SO_4$ strength is employed as the dehydrating agent. In this operation, the strength of the residual sulfuric acid may very well be substantially below commercially desirable $H_2SO_4$ strength with the result that reconcentration of large volumes of relatively weak sulfuric acid is necessary.

It would be highly desirable for users who make their own anhydrous hydrochloric acid from e. g. their own by-product relatively weak aqueous hydrochloric acid, to have available a process which can be employed so as to permit substitution of simple easily operated and maintained apparatus for the customary relatively complicated and cumbersome tower systems, and which process may be readily conducted in such a way as to form an adequately dry hydrogen chloride and to produce a residual sulfuric acid containing substantially no HCl or other dehydrating operation by-products and having an $H_2SO_4$ strength within the range of the customary readily useable or saleable commercial sulfuric acids, e. g. acids of strength of about 80% $H_2SO_4$ and upward, or preferably and more importantly 66° Bé. (93.2%) $H_2SO_4$ strength. The principal object of the present invention is to provide anhydrous hydrochloric acid manufacture processes which afford the foregoing advantages, and have none of the above noted major disadvantages of prior proposals.

This invention is characterized by the use, as aqueous hydrochloric acid dehydrating agents, of materials having relatively high content of free $SO_3$, e. g. oleums or liquid sulfur trioxide. In general, the invention procedurally involves incorporating certain herein described liquid oleums or liquid sulfur trioxides with aqueous hydrochloric acid under certain operating conditions, and recovering substantially anhydrous hydrochloric acid which expression is used herein to include completely anhydrous hydrogen chloride and hydrochloric acid which may contain up to say 1–2% by weight of water. It will be appreciated that the greater the free $SO_3$ content of the herein described dehydrating agents, the greater would be the advantages afforded from all viewpoints. Thus, volume of dehydrating agent containing free $SO_3$ purchased by the user, and the attendant handling and shipping costs are minimized. Again, the higher the free $SO_3$ strength of the dehydrating agent employed by the user, the more compact his equipment may be, and the greater may be the $H_2SO_4$ strength of the user's by-product sulfuric acid.

However, the shipment, storage and general useability of liquid sulfur trioxide and particularly high strength oleums are complicated and made highly difficult by certain inherent properties which characterize the ordinary commercially available high strength oleums and liquid sulfur trioxides. For example, if a user of substantially anhydrous hydrogen chloride in gas or liquid form desired to make his own anhydrous hydrochloric acid from his own by-product weak hydrochloric acid, it would be practicably impossible or at least completely uneconomic to attempt to employ the ordinary commercially available high strength oleums or liquid sulfur trioxides, for the reason that these materials, as usually available are solids or semi-solids.

At room temperature, liquid sulfur trioxide polymerizes to various degrees. The three generally recognized $SO_3$ modifications melt at approximately 17° C., 32.5° C., and 62° C., respectively. On standing at temperature below about 27° C., in the presence of even small amounts of moisture, the form melting at about 17° C. rapidly polymerizes to the higher melting forms, the mass soon becomes solid, and melts only under pressure, sometimes requiring temperatures up to 100° C. to effect complete liquefaction. Oleums of free $SO_3$ strengths upward of about 80% (i. e. so-called 80% oleum) tend to polymerize in similar fashion, degree of polymerization depending chiefly upon the $SO_3$ strength of the oleum and temperatures at which the material is stored. In oleums of the lower portions of the $SO_3$ strength range indicated, certain polymers form, the degree of polymerization increases on passage of time, and while the material may not solidify completely, the ultimate mass may be a liquid phase containing in suspension a large portion of the various solid polymers noted.

For example, while liquid sulfur trioxide might be shipped in drums equipped with heating coils, there is involved the first problem of supplying a relatively expensive form of container. Since heat transfer thru a solid material is poor, the solidified sulfur trioxide in the container can be melted by the user only with considerable difficulty. In addition to this disadvantage, after relatively long periods of standing, a large proportion of the sulfur trioxide will have polymerized to the high melting form in which case complete melting can only be effected by heating at high temperature under considerable pressure. The same disadvantages apply to the indicated high strength oleums only to a lesser degree. Accordingly, it will be understood that ordinary liquid sulfur trioxide and ordinary commercial oleums of free $SO_3$ strength high enough to afford the substantial advantages provided by this invention are normally either solid or substantially solid at room temperature because of the indicated polymerization. Thus, ordinary liquid $SO_3$ and oleums of strength above about 76–78% free $SO_3$ are substantially solid at about room temperature. The foregoing situation alone creates such problems of shipment, storage and conversion of the sulfur trioxide or high strength oleum to liquid useable form as to render use of ordinary liquid sulfur trioxides and strong oleums prohibitive for purposes of the instant improvements.

It has been found that the objectives of the invention may be accomplished by incorporating together liquid aqueous hydrochloric acid and a liquid dehydrating agent having a specified high free $SO_3$ strength and containing substantially no $SO_3$ polymers. The resulting reaction produces reaction-formed or residual sulfuric acid and, in accordance with the invention, substantially anhydrous HCl. Incorporation of the two liquids is brought about under such temperature control as to prevent evolution from the resulting reaction mass of an appreciable amount of any compound other than substantially anhydrous hydrochloric acid gas. Further, during this incorporation operation the quantity of the particular high free $SO_3$ material utilized is regulated, relative to the $H_2O$ content of the aqueous hydrochloric acid being treated and relative to the $H_2O$ content of any extraneous sulfuric reaction medium which permissibly may be present so as to maintain total sulfuric acid liquor in the reaction zone throughout the reaction within a certain $H_2SO_4$ strength range. The substantially anhydrous hydrochloric acid gaseous product evolved may be recovered in any form desired for subsequent use, either as a gas or a liquid.

Apparatus needed to carry out the invention process is simple. The major item of equipment comprises a closed reactor of size suitable to the operation at hand. The reaction vessel may be made of glass-lined or porcelain-lined steel or any other material resistant to HCl. The reactor should be provided with jacketing or other suitable means to facilitate temperature control of the reaction and maintain temperatures during the reaction below a certain maximum. The vessel also may be equipped with adequate valved inlets for introduction of liquid aqueous hydrochloric acid, liquid dehydrating agent, an outlet for withdrawal of residual sulfuric acid, and a gas off-take pipe for conducting the anhydrous hydrochloric acid to the point of use. The apparatus may be arranged for batch or continuous operation.

The invention is best adapted to the production of anhydrous hydrochloric acid from aqueous hydrochloric acid containing ordinarily not less than about 20% HCl, this strength and upwards being fairly representative of the HCl content of by-product hydrochloric acids of many industrial operations. Advantages afforded by the invention become more pronounced the higher the HCl strength of the incoming liquid aqueous hydrochloric acid. Thus, to obtain the better advantages, use of the readily commercially available 18° Bé (28% HCl) and stronger aqueous hydrochloric acids are preferred as starting materials. The invention is also applicable to the production of anhydrous hydrochloric acid from aqueous hydrochloric acid of HCl strength less than 20%, although in some instances advantages afforded by these improvements may not be outstandingly attractive when using aqueous hydrochloric acid starting materials of less than about 10% HCl strength.

A major feature of the invention lies in the nature of the dehydrating agents employed. These materials have free $SO_3$ strength in the range of not less than 80% upwardly to 100%, i. e. from liquid so-called 80% oleum up to 100% liquid $SO_3$. As indicated above, ordinarily commercially available materials of this nature, at about room temperature, are wholly solid, or contain so much solid phase polymer as to be unhandleable as liquid and hence considered solids from any practical viewpoint. The major distinction between ordinarily obtainable liquid sulfur trioxides and oleums of not less than 80% free $SO_3$ content and the corresponding free $SO_3$ content materials indicated above as the dehydrating agents employed in accordance with the invention is that the latter are substantially polymer free. The dehydrating agents of the invention, which agents per se are known in the art, may be considered as substantially $SO_3$ polymer free material of the group consisting of liquid sulfur trioxide and oleums of free $SO_3$ strength not less than 80%. These agents are stabilized or negatively catalyzed (by inclusion of an additive), toward polymerization. For all practical purposes, the herein dehydrating agents are liquid at about room temperature, but permissibly may contain not more than about 3% by weight of $SO_3$ polymer substances all of which are readily meltable at temperature not greater than about 40° C. In the lower portions of the indicated 80–100% free $SO_3$ range, at room temperature the oleums may contain some suspended polymer material the presence of which, from practical viewpoint, is of no consequence in carrying out the procedure of the invention. The suspended $SO_3$ polymer substances in the lower strength oleums may run as high as about 3% by weight, but such substances if present and undesirable for some particular operation may be readily melted by heating the particular oleum to temperature not in excess of about 40° C.

The preferred dehydrating agents are of the character described and are materials of the group consisting of liquid sulfur trioxide and oleum of free $SO_3$ content not less than about 99.4%. Dehydrating agents of this nature are wholly liquid at room temperature, rarely contain any suspended polymer, but if so the polymer content is not more than about 1% by weight and, similarly as above, all such $SO_3$ polymer substances which may be present are readily meltable at temperature not greater than about 40° C.

The $SO_3$ polymer free dehydrating agents of the invention are inhibited to minimize or prevent polymerization by inclusion therein of a relatively small amount of an additive which apparently functions as a negative catalyzer or stablizer. Various types of additives may be utilized to effect and maintain the substantially polymer free properties of the dehydrating agents of the invention. For example, certain boron compounds may be employed, and suitable materials are those of the class consisting of the oxides, and halides of boron and the inorganic derivatives thereof such as $B_2O_3$; $BCl_3$; $BF_3$; borax, $Na_2B_4O_7$; sodium and potassium fluoborates, $NaBF_4$ and $KBF_4$; boric acid, $H_3BO_3$; or any of its dehydrated forms such as metaboric acid, $HBO_2$, or pyroboric acid, $H_2B_4O_7$. Quantities of such additives may vary from any small effective amount to a quantity equivalent to not more than about 1.5% by weight of boron based on the weight of the particular oleum or liquid $SO_3$ treated.

A satisfactory procedure for making one of the substantially $SO_3$ polymer free dehydrating agents of the invention is as follows. $SO_3$ vapor, formed by distillation of 60% oleum under conditions to avoid vaporization of $H_2SO_4$, was condensed in a closed vessel at temperature of about 20° C., anhydrous $B_2O_3$ having been previously placed in the vessel. The amount of the $B_2O_3$ employed was equivalent to about 0.09% of boron based on the total weight of condensed $SO_3$. After all the $SO_3$ used in the run was condensed, the liquor mass in the vessel was agitated and there was obtained a product which on standing at temperature less than 20° C., contained some polymers, but all such polymers melted when the treated material was heated to about 40° C. Manufacture in general of negatively catalyzed strong oleums and liquid sulfur trioxides per se, which may be used as dehydrating agents in accordance with the present invention, is disclosed in the prior art e. g. in U. S. P. 2,458,718 of January 11, 1949. Further, substantially $SO_3$ polymer free dehydrating agents may be made by incorporating, with substantially anhydrous sulfur trioxides or with oleums of $SO_3$ strengths such that $SO_3$ polymers tend to form i. e. oleums of strength upward of about 80% free $SO_3$, relatively small amounts of the boron compounds methyl borate or boron trifluoride-dimethyl etherate or mixtures thereof. Amounts of these compounds may be equivalent to 0.01 to 0.6% by weight of boron based on the weight of the particular oleum or liquid $SO_3$ treated. Specific examples demonstrating use of these materials as negative catalyst are indicated in U. S. P. 2,492,706 of December 27, 1949. Additionally, relatively small amounts of antimony pentafluoride and antimony pentachloride may be employed as additives to form the substantially $SO_3$ polymer free dehydrating agents of the present development. Quantities of the antimony pentafluoride and antimony pentachloride employed may vary in the range of e. g. 0.4 to 2.5% by weight of the high strength oleum or liquid sulfur trioxide treated. Specific examples showing manufacture of polymer free high $SO_3$ oleums and liquid sulfur trioxides are noted in U. S. P. 2,511,072 of June 13, 1950.

In carrying out the invention, contact or incorporation of the liquid aqueous hydrochloric acid and the substantially $SO_3$ polymer free dehydrating agent with each other is effected in certain ways. The invention affords the advantage of permitting use of a simple pot-type reactor as previously described, and operation may be batchwise or continuous. In practice, a major objective is avoidance in the reaction zone of any significant excess of $SO_3$ over approximately the proper proportions of aqueous hydrochloric acid and dehydrating agent to be employed in any particular operation. The absence of any substantial excess of $SO_3$ is important to prevent formation of undesirable chlorosulfonic acid. Such objective may be accomplished procedurally by the manner in which the aqueous hydrochloric acid and the dehydrating agent are introduced itno the reaction zone. For example, when operating batchwise, if desired, all of the aqueous hydrochloric acid to be employed may be fed into the reaction zone, and thereafter the total amount of dehydrating agent may be charged preferably as in the form of a gradually added liquid stream. Generally, it is more convenient to introduce the aqueous hydrochloric acid and the dehydrating agent into the reaction zone simultaneously and gradually, quantities of each usually being in about the proper relative proportions for any given operation, care being taken to avoid at any time the presence of any appreciable excess of $SO_3$. For a continuous operation, the latter described simultaneous and gradual introduction into the reaction zone of the reactants in approximately proper proportions is preferred. Each of the foregoing methods for incorporating together the reactants described has the practical advantage of affording a steady, continuous evolution of anhydrous HCl. In this specification and appended claims, unless otherwise modified, the expression "incorporating together," when used with reference to the liquid hydrochloric acid and the dehydrating agent, is intended to indicate that, in the reaction zone, the dehydrating agent is added to an excess of the aqueous hydrochloric acid or, alternatively, approximately the proper proportions of aqueous hydrochloric acid and dehydrating agent with no appreciable excess of the latter are introduced substantially simultaneously into the reaction zone.

At the outset of operation, if desired, the hydrochloric acid and dehydrating agent may be introduced into an otherwise empty reactor provided rates of introduction are slow enough and heat removal means are adequate to keep reaction mass temperatures below those indicated. However, such procedure is not preferred for two principal reasons. In the early phases of reaction the bulk of reaction-formed strong sulfuric acid though continuously increasing is relatively small and some quantities of evolved HCl may pass off without optimum dehydration. Further, with only a relatively small volume of reaction-formed strong sulfuric acid, proper heat dissipation though possible may be impractical and un-economic. Accordingly, it is preferred to charge the reactants into a reactor which at the outset of operation contains a substantial body of strong sulfuric acid reaction medium which, for purposes of distinguishing from the strong sulfuric acid formed during the reaction, may be considered as extraneously introduced sulfuric acid. Such sulfuric acid reaction medium may be the sulfuric acid residue of a prior operation. For example, if operation is batchwise, the reactor may initially contain extraneously introduced sulfuric acid reaction medium in volume amounting to the equivalent of say one to three times the combined volumes of the hydrochloric acid and dehydrating agent to be fed into the reactor. If operation is to be continuous, at the beginning of operation the reactor may be charged, before introduction of reactants, with strong sulfuric acid reaction medium in volume such that this body of reaction medium, together with whatever other heat removal means may be available are sufficient to facilitate smoothness of reaction and particularly the heat dissipation needed for that particular operation. Thereafter, accumulated sulfuric acid resulting from the reaction itself may be continuously drawn off, leaving in the reactor a sufficient amount of liquor to permit proper temperature control.

Temperature control is a feature of major importance. Temperature of reactants during the incorporation operation is regulated to prevent evolution from the reacting mass of appreciable amount of any compound other than substantially dehydrated HCl gas. In general, temperature of the reacting mass in the closed vessel should be held at a maximum of not more than 50° C. In best aspects of the invention, i. e. utilizing as dehydrating agent substantially $SO_3$ polymer free material of the group consisting of liquid sulfur trioxide and oleum of free $SO_3$ strength not less than 99.4%, temperatures in the reactor should not exceed about 46° C., usual operating temperatures in these instances being preferably in the range of 30–45° C. When employing oleums in the lower portion of the range of 80% oleum up to liquid sulfur trioxide, reactor temperatures may be permitted to rise as high as about 50°.

In conjunction with the body of sulfuric acid liquor preferably maintained in the reactor, control of temperature may be effected by adequate heat transfer to extraneous cooling medium, or by regulation of rates of addition of incoming aqueous hydrochloric acid and dehydrating agent. However, a combination of these features is preferred, and practice indicates that most satisfactory temperature regulation may be had by a combination of heat removal from the reactor by extraneous cooling medium circulated through the reactor jacket and gradual addition of reactants at controlled rates. By adjusting such rates in accordance with the substantial relatively fixed amounts of heat which may be removed by extraneous cooling medium and the body of sulfuric acid liquor, no difficulties in maintenance of proper temperatures in the reactor need be encountered.

Another major feature of process control lies in the selection of the free $SO_3$ content of and the quantity of the particular dehydrating agent to be employed in any given operation. The foregoing is in turn dependent upon one and generally two other important factors of successful operation, i. e. the $H_2SO_4$ concentration of the sulfuric acid to be formed as a result of the interaction of liquid aqueous hydrochloric acid and dehydrating agent, and the $H_2SO_4$ concentration of any extraneous sulfuric acid reaction medium which may and preferably is present at least at the beginning of an operation. In general, depending upon the free $SO_3$ content of the particular dehydrating agent employed, the quantity thereof utilized should be chosen and regulated such that there is supplied to the reactor less available $SO_3$ than is needed to tie up, as 100% $H_2SO_4$, with all the available $H_2O$ present, i. e. less than needed to tie up with the $H_2O$ of the aqueous hydrochloric acid being treated and with the $H_2O$ of any sulfuric acid reaction medium which may be present. Thus, reaction-formed sulfuric acid has an $H_2SO_4$ strength of less than 100%, and the $H_2SO_4$ strength of any sulfuric acid reaction medium present is held less than 100%, with the result that the total sulfuric acid liquor in the reaction zone is maintained throughout the reaction at $H_2SO_4$ strength less than 100%, and not more than 99% is preferred. The condition of maximum $H_2SO_4$ strength in the total sulfuric acid liquor in the reactor insures the absence of undesirable chlorosulfonic acid, the presence of which would significantly devaluate such sulfuric acid liquor with regard to its general useability. In the best aspects of the invention, depending upon the free $SO_3$ content of the particular dehydrating agent, the quantity used is such that the maximum $H_2SO_4$ strength of the total sulfuric acid liquor in the reaction zone does not exceed about 95%.

Particularly when employing pot-type apparatus of the nature indicated, it has been found that to insure production of an HCl gas adequately dry to meet commercial so-called anhydrous hydrogen chloride requirements, minimum $H_2SO_4$ strength of reaction-formed sulfuric acid and of any extraneous sulfuric acid reaction medium should be each not less than about 80%. Hence, depending upon the free $SO_3$ content of the particular dehydrating agent employed, the quantity thereof utilized is controlled so as to supply to the reactor enough available $SO_3$ so that the $H_2SO_4$ strength of the reaction-formed sulfuric acid is not less than about 80%, and $H_2SO_4$ strength of sulfuric acid reaction medium present is held not less than about 80%. Thus, the total sulfuric acid liquor in the reaction zone is held at $H_2SO_4$ strength not less than 80%, and not less than 90% is preferred. In the best forms of the invention, the quantity of dehydrating agent employed is such that the minimum $H_2SO_4$ strength of the total sulfuric acid liquor in the reaction zone is not less than about 93%.

When employed, extraneous sulfuric acid reaction medium should have, at the outset of an operation, an $H_2SO_4$ strength in the range of about 80% to less than 100%, preferably 90% to not more than 99%. It will be understood that as the operation proceeds, the amounts of reaction-formed sulfuric acid produced are relatively large and hence as reaction progresses the $H_2SO_4$ strength of the initial sulfuric acid reaction medium automatically adjusts itself upwardly or downwardly to the $H_2SO_4$ strength of the reaction-formed sulfuric acid. If, at the beginning of an operation, the sulfuric acid reaction medium does not have an $H_2SO_4$ strength the same as the $H_2SO_4$ strength of the reaction-formed sulfuric acid sought to be produced, within a relatively short time after initiation of operation, the $H_2SO_4$ strength of the total sulfuric acid liquor in the reaction zone rapidly becomes the same as the $H_2SO_4$ strength of the reaction-formed sulfuric acid. Consequently, and to illustrate, it will be understood that if, in a given operation, the sulfuric acid reaction medium had an initial $H_2SO_4$ strength of 90%, and it is desired to proceed in such a way as to produce a reaction zone sulfuric acid product having a strength in the range of about 93–95%, at the beginning of operation the total sulfuric acid liquor in the reaction zone would have an $H_2SO_4$ strength of about 90% or a little above, and thereafter such strength soon would rise to within the range indicated, and during the final phase of reaction the $H_2SO_4$ strength of the total sulfuric acid liquor in the reaction zone would lie in the 93–95% range.

In view of the foregoing permissible operational variabilities including the $H_2O$ content of the liquid aqueous hydrochloric acid and of the free $SO_3$ content of the particular dehydrating agents described, it will appear that in the case of use of a particular aqueous hydrochloric acid and a particular dehydrating agent, the relative amounts of such particular reactants may be determined e. g. by one or two test runs.

As indicated, operation may be either batchwise or continuous. In the latter instance, it is only necessary to provide for continuous draw-off from the reactor of sulfuric acid liquor of the indicated $H_2SO_4$ strength, and to provide for continuous supply of incoming aqueous hydrochloric acid and dehydrating agents. The substantially anhydrous HCl gas produced may be recovered from the reactor gas-offtake in any suitable way.

In the following examples, detailed to illustrate practice of best embodiments of the invention, the dehydrating agent employed was a liquid sulfur trioxide having a boiling point a little below 45° C. and which was wholly liquid at room temperature and contained no detectable amount of $SO_3$ polymer and which was negatively catalyzed toward polymerization by the inclusion of $B_2O_3$ in amount equivalent to about 0.1% of boron based on the weight of the total amount of liquid $SO_3$. This particular dehydrating agent was manufactured substantially in accordance with the second example of P. S. Patent 2,458,718 of January 11, 1949. In the following examples, parts are parts by weight unless otherwise indicated. The apparatus employed comprises a closed coolant-jacketed reactor provided with an agitator, separate inlets for aqueous hydrochloric acid and dehydrating agent, and with a gas offtake for anhydrous hydrochloric acid. The hydrochloric acid and dehydrating agent inlets were equipped with means to facilitate control of rates of feed of these materials.

*Example 1*

The reactor was charged initially with 500 parts of sulfuric acid having an $H_2SO_4$ strength of 95.3%. During reaction the mass in the reactor was kept agitated. There was simultaneously added to the reactor 100 parts of 35.2% aqueous hydrochloric acid and 200 parts of dehydrating agent, addition of these materials being effected over a period of 50 minutes. The external cooling employed was such that, in conjunction with the gradual addition of the reactants, the temperature of the reaction mixture was maintained at 33–45° C. The anhydrous HCl gas formed was vented. There was left in the reactor 761 parts of residual sulfuric acid (99.5% of theory) which analyzed 94.4% $H_2SO_4$. The sulfuric acid heel contained less than 0.1% residual HCl.

*Example 2*

Using the same apparatus and general procedure as in Example 1, 717 parts of the residual sulfuric acid formed in Example 1 where charged into the reactor followed by addition of 100 parts of 35.2% aqueous hydrochloric acid over a 12 minute period during which temperature was maintained at about 35–38° C. 200 parts of dehydrating agent were added over a period of 17 minutes, rate of addition of dehydrating agent in conjunction with external cooling being such that temperatures were maintained within the range of 35–45° C. 35 parts of HCl (99.5% of theory) were obtained and the heel comprises 978 parts of residual sulfuric acid (99.5% of theory), such acid having $H_2SO_4$ strength of 93.9%, and containing less than 0.1% HCl.

*Example 3*

Employing the same apparatus and procedure as above, 669 parts of residual sulfuric acid heel from Example 2 were charged into the reactor, and 100 parts of aqueous hydrochloric acid of 35.2% strength were added during a period of 4 minutes, rate of addition of hydrochloric acid and external cooling being so correlated that temperature during addition of the hydrochloric acid was in the range of about 30–40° C. During a 20 minute period, 200 parts of dehydrating agent were added, external cooling and rate of the addition of the agent being such that temperature in the reactor was held within the range of 37–40° C. 35 parts (99.1% of theory) of HCl were recovered. In the reactor there remained 932 parts of residual sulfuric acid having $H_2SO_4$ strength of 93.6% and containing less than 0.01% residual HCl.

From the foregoing examples, it will be noted that the invention provides a markedly efficient method of producing substantially anhydrous HCl, an outstanding and important advantage lying in the fact that, as demonstrated, the sought-for substantially anhydrous product is not only easily obtained, but there is formed as by-product a sulfuric acid which, in terms of purity and $H_2SO_4$ strength, has readily useable or saleable requirements of the 66° Bé. (93–94% $H_2SO_4$) sulfuric acid of commerce.

We claim:

1. The process for the production of substantially anhydrous hydrochloric acid gas which process comprises incorporating together, while maintaining the absence of any significant excess of $SO_3$, (1) liquid aqueous hydrochloric acid and (2) substantially $SO_3$ polymer free material of the group consisting of liquid sulfur trioxide and oleum of free $SO_3$ strength not less than 80%, said material being negatively catalyzed toward polymerization and being liquid at room temperature and permissibly containing not more than about 3% by weight of $SO_3$ polymer substances all of which are readily meltable at temperature not greater than about 40° C.; maintaining temperature of the resulting reacting mass below 50° C., high enough to keep said material in liquid phase, and low enough to prevent evolution from the reacting mass of appreciable amount of any compound other than substantially anhydrous HCl gas; regulating the quantity of said material utilized, relative to the $H_2O$ content of (a) said aqueous hydrochloric acid and (b) any sulfuric acid reaction medium which may be present, to effect maintenance of total sulfuric acid liquid in the reaction zone at $H_2SO_4$ strength throughout the reaction substantially in the range of 80% to less than 99% and during at least the final phase of reaction substantially in the range of 90–95%; recovering sulfuric acid of $H_2SO_4$ strength substantially in the range of 90–95%, and recovering substantially anhydrous hydrochloric acid gas.

2. The process for the production of substantially anhydrous hydrochloric acid gas which process comprises incorporating together, while maintaining the absence of any significant excess of $SO_3$, (1) liquid aqueous hydrochloric acid having an HCl strength not less than about 20% and (2) substantially $SO_3$ polymer free material of the group consisting of liquid sulfur trioxide and oleum of free $SO_3$ strength not less than 99.4%, said material being negatively catalyzed toward polymerization and being liquid at room temperature and permissibly containing not more than about 1% by weight of $SO_3$ polymer substances all of which are readily meltable at temperature not greater than about 40° C.; maintaining temperature of the resulting reacting mass not in excess of 46° C., high enough to keep said material in liquid phase, and low enough to prevent evolution from the reacting mass of appreciable amount of any compound other than substantially anhydrous HCl gas; regulating the quantity of said material utilized, relative to the $H_2O$ content of (a) said aqueous hydrochloric acid and (b) any sulfuric acid reaction medium which may be present, to effect maintenance of total sulfuric acid liquid in the reaction zone at $H_2SO_4$ strength throughout the reaction substantially in the range of 80% to less than 99% and during at least the final phase of reaction substantially in the range of 90–95%; recovering sulfuric acid of $H_2SO_4$ strength substantially in the range of 90–95%, and recovering substantially anhydrous hydrochloric acid gas.

3. The process for the production of substantially anhydrous hydrochloric acid gas which process comprises simultaneously and gradually introducing into a body of sulfuric acid reaction medium, having an $H_2SO_4$ strength in the range of 80–99% and while maintaining the absence of any significant excess of $SO_3$, (1) liquid aqueous hydrochloric acid having an HCl strength not less than about 28% and (2) substantially $SO_3$ polymer free material of the group consisting of liquid sulfur trioxide and oleum of free $SO_3$ strength not less than 99.4%, said material being negatively catalyzed toward polymerization and being liquid at room temperature and permissibly containing not more than about 1% by weight of $SO_3$ polymer substances all of which are readily meltable at temperature not greater than about 40° C.; maintaining temperature of the resulting reaction mass not in excess of 46° C., high enough to keep said material in liquid phase, and low enough to prevent evolution from said mass of appreciable amount of any compound other than substantially anhydrous HCl gas; regulating the quantity of said material utilized, relative to the $H_2O$ content of (a) said aqueous hydrochloric acid and (b) the sulfuric acid reaction medium, to effect maintenance of total sulfuric acid liquor in the reaction zone at $H_2SO_4$ strength throughout the reaction substantially in the range of 80% to not more than 99% and during at least the final phase of reaction substantially in the range of 93–95%; recovering sulfuric acid of $H_2SO_4$ strength substantially in the range of 93–95%, and recovering substantially anhydrous hydrochloric acid gas.

References Cited in the file of this patent

UNITED STATES PATENTS

| | | |
|---|---|---|
| 2,139,721 | Carl | Dec. 13, 1938 |
| 2,316,633 | Smith | Apr. 13, 1943 |
| 2,367,301 | Mohr | Jan. 16, 1945 |
| 2,458,718 | McCann | Jan. 11, 1949 |
| 2,492,706 | McCann et al. | Dec. 27, 1949 |
| 2,511,072 | McCann | June 13, 1950 |

OTHER REFERENCES

Mellor's "Inorg. Chem.," vol. 10, page 344. Longmans, Green & Co., N. Y.